July 22, 1958     F. A. CAMPBELL     2,843,938

HOLE AND SLOT GAUGE WITH THREADED ADJUSTING MEANS

Filed Feb. 10, 1956

Floyd A. Campbell
INVENTOR.

United States Patent Office 2,843,938
Patented July 22, 1958

2,843,938
HOLE AND SLOT GAUGE WITH THREADED ADJUSTING MEANS

Floyd A. Campbell, Springfield, Ohio

Application February 10, 1956, Serial No. 564,815

5 Claims. (Cl. 33—163)

This invention generally relates to a hole or slot gauge and more particularly provides an improved structure over that disclosed and claimed in my co-pending applications, Serial No. 392,941, filed November 18, 1953, and Serial No. 489,371, filed February 21, 1955.

An object of the present invention is to provide a slot or hole gauge having circular flanged contact surfaces forming pointers for indicating the width or depth of interior or exterior slots.

Another important object of the present invention is to provide means for adjusting the position of the indicators or pointers whereby a relatively quick adjustment may be provided to the approximate width of the slot being measured after which a fine adjustment may be made after the approximate adjustment is reached thereby facilitating the measuring procedure.

Yet another object of the present invention is to provide a gauge having adjustment means as set forth in the preceding objects together with means for positively locking the pointers in position after an adjustment or measurement is made.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 4:
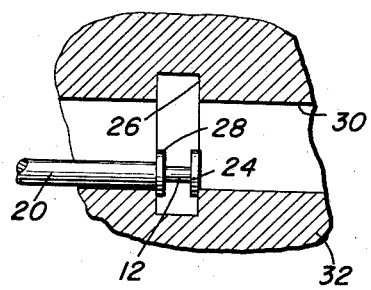
Figure 4 is a detailed view illustrating the gauge of the present invention in use for measuring the width of an annular slot.

Referring now specifically to the drawing, the numeral 10 generally designates the hole and slot gauge of the present invention including an elongated rod 12 having a threaded end portion 14 terminating in a handle knob 16 having a knurled surface 18 for facilitating the rotation of the rod 12. Slidably mounted on the rod 12 is an elongated tubular sleeve 20 having a longitudinal bore 22 therethrough for slidable movement on the rod 12. The rod 12 is provided with a circular plate 24 on the free end thereof and the sleeve 20 is also provided with a circular plate 26 forming pointers for movement relative to each other for measuring the width of a slot or hole such as the slot 28 formed in the bore 30 in a workpiece 32 illustrated in Figure 4. The plates 26 and 24 may be removable such as by a threaded connection 34 to permit other types of pointers or indicators to be positioned thereon and to permit disassembly of the rod 12 and sleeve 20.

Figure 1:
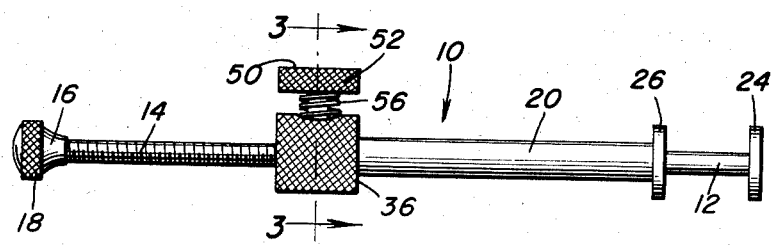
Figure 1 is a side elevational view of the gauge of the present invention.
Figure 2:
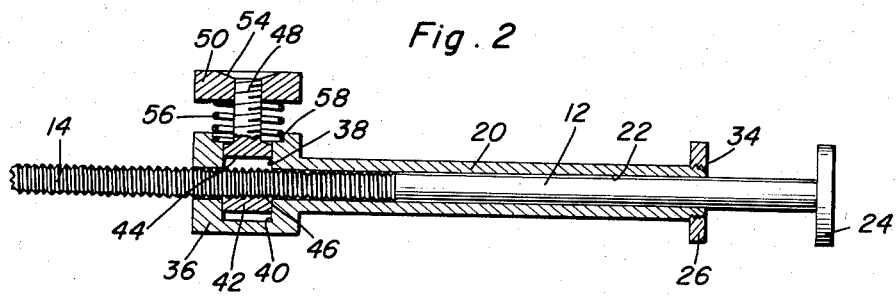
Figure 2 is a longitudinal, vertical sectional view taken substantially upon a plane passing along the longitudinal center of the present invention with the handle end portion of the rod being omitted with the adjustment details and the pointer end of the gauge being enlarged.
Figure 3:
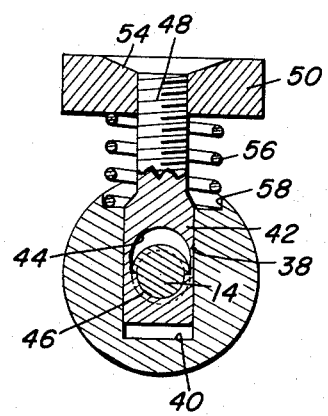
Figure 3 is a transverse, vertical sectional view taken substantially upon a plane passing along section line 3—3 of Figure 1 and being on an enlarged scale for illustrating the details of the adjustment mechanism.

The sleeve 20 is provided with an enlarged end portion 36 at one end thereof having a laterally extending bore 38 terminating in a socket 40 which is diametrically opposed to the bore 38. An elongated collar 42 is slidably disposed in the bore 38 and socket 40 and the collar 42 is provided with an oval-shaped bore 44 encircling the threaded portion 14 of the rod 12 and the lower portion of the oval-shaped bore 44 is provided with threads 46 in engagement with the threaded portion 14. The upper end of the collar 42 is provided with a threaded stud 48 having a clamp nut 50 thereon with a knurled outer surface 52 and a concave upper surface 54 forming a thumb rest or finger rest for moving the collar 42 against tension of compression coil spring 56 disposed between the nut 50 and a seat 58 in the enlarged end portion 36 of the sleeve 20 whereby the spring 56 will normally resist relative rotation between the rod 12 and sleeve 20 thereby locking the pointers 24 and 26 in adjusted position. When the nut 50 is tightened to completely collapse the spring 56, the rod 12 will be positively locked to the sleeve 20. When the nut 50 is at its outer position such as illustrated in Figure 3, the threads 46 may be disengaged from the threads 14 by depressing the nut 50 by lateral finger pressure whereby a rough adjustment may be made after which a fine adjustment may be made by rotating the handle knob 16, thereby providing an initial approximate adjustment followed by a fine adjustment wherein the device may be frictionally or positively locked in adjusted or measured position with a minimum of effort.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A gauge comprising an elongated rod having a pointer on one end thereof and a handle means on the other end, a portion of said rod being screw-threaded, an elongated tubular sleeve slidably mounted on and enclosing a major portion of said rod and having a pointer at one end thereof for association with the pointer on the rod for measuring distances, and means on the other end of said sleeve for engagement with the threaded portion of the rod for securing the sleeve in adjusted position on the rod thereby retaining the pointers in adjusted position, said means including an enlarged end on the sleeve having a laterally extending blind bore therein, said bore extending beyond the center of the sleeve, a collar encircling the threaded portion of the rod and having an oval-shaped bore with the lower portion thereof being screw-threaded for engagement with the threads on the rod, a laterally projecting stud on said collar, said collar being slidably received in said lateral bore, and spring means between the enlarged end of the sleeve and the stud for urging the stud outwardly from the sleeve for resiliently frictionally engaging the threads in the collar with the threads on the rod for retaining the sleeve and rod and the pointers thereon in adjusted position and permitting rotation of the rod with the handle knob for varying the position of the pointers.

2. The combination of claim 1 wherein said stud is threaded, an internally threaded nut on said stud, said spring means including a compression coil spring between the nut and the enlarged end of the sleeve whereby the tension on the spring may be adjusted for varying the resistance to relative rotation between the rod and sleeve.

3. The combination of claim 2 wherein said nut is provided with a concave upper surface forming a finger-engaging seat for facilitating inward movement of the stud and collar thereby disengaging the threads in the collar from the threaded portion of the rod thereby permitting free longitudinal movement between the sleeve and rod.

4. The combination of claim 3 wherein the enlarged end of the sleeve is provided with a counterbore forming a seat for said compression coil spring whereby the nut may completely compress the spring for rigidly locking the sleeve and rod rigidly in longitudinally adjusted position.

5. A measuring instrument comprising an elongated tubular sleeve having a pointer at one end thereof, an elongated rod slidably and rotatably mounted in said sleeve and projecting beyond each end thereof, a pointer on one end of said rod for adjustment in relation to the pointer on the sleeve for measuring distances, a handle on the other end of the rod for manipulation thereof, said sleeve encircling the major portion of the rod with the rod being externally threaded from the handle to a point within the confines of the sleeve when the sleeve is remote from the handle, the remainder of the rod being smooth for providing a bearing for the sleeve, said sleeve having a laterally extending bore in the other end thereof and extending from the surface of the sleeve beyond the longitudinal bore in the sleeve, a collar slidably disposed in said bore, said collar having an oval-shaped aperture therein disposed in encircling relation to the threaded portion of the rod, said aperture having segmental threads on the lower surface thereof, a threaded stud on said collar extending laterally beyond the sleeve, a thumb nut on said stud, and a coil spring encircling said stud and engaging the nut and the sleeve for urging the collar laterally for engaging the segmental threads with the rod for permitting movement of the rod by rotation thereof, compression of the coil spring by exerting lateral pressure on the thumb nut completely disengaging the segmental threads from the rod for permitting free longitudinal sliding movement thereof, the convolutions of the spring contacting each other when the nut is tightened for rigidly locking the collar and rod and the frictional resistance to rotation of the rod being variable by adjusting the nut.

References Cited in the file of this patent
UNITED STATES PATENTS

| | | |
|---|---|---|
| 299,722 | Bellows | June 3, 1884 |
| 620,337 | Lavigne | Feb. 28, 1899 |
| 909,538 | Buckminster | Jan. 12, 1909 |
| 1,321,312 | Jooss | Nov. 11, 1919 |
| 2,151,305 | Serdock | Mar. 21, 1939 |
| 2,688,190 | Hayes | Sept. 7, 1954 |